No. 834,106. PATENTED OCT. 23, 1906.
T. W. BROOMELL.
RESILIENT WHEEL.
APPLICATION FILED NOV. 28, 1905.

2 SHEETS—SHEET 1.

WITNESSES
G. H. Smith.
A. J. Foster

INVENTOR.
Thomas W. Broomell.
By Harry D. Wallace
Attorney.

No. 834,106. PATENTED OCT. 23, 1906.
T. W. BROOMELL.
RESILIENT WHEEL.
APPLICATION FILED NOV. 28, 1905.

2 SHEETS—SHEET 2.

WITNESSES
G. H. Smith
A. L. Foster

INVENTOR,
Thomas W. Broomell
By Harry D. Wallace
Attorney.

UNITED STATES PATENT OFFICE.

THOMAS W. BROOMELL, OF WATERTOWN, NEW YORK.

RESILIENT WHEEL.

No. 834,106.

Specification of Letters Patent.

Patented Oct. 23, 1906.

Application filed November 28, 1905. Serial No. 289,467.

*To all whom it may concern:*

Be it known that I, THOMAS W. BROOMELL, a citizen of the United States, residing at Watertown, in the county of Jefferson and State of New York, have invented certain new and useful Improvements in Resilient Wheels, of which the following is a specification.

This invention relates to improvements in resilient wheels designed for use in connection with automobiles, carriages, and the like; and the invention relates particularly to a wheel wherein the resilient or elastic parts are applied to the center or hub field instead of being disposed at or near the rim of the wheel.

The object of the invention is to provide a resilient wheel the construction of which is simple and inexpensive and wherein the several parts comprising my improvement are more durable and less liable to become damaged or impaired while in service than other wheels of the class.

An important feature of the invention consists in providing a series of springs, preferably arranged in pairs, comprising one right and one left handed coil, each pair inclosed in a telescoping spring-box, and disposing them around the axle and wheel-hub of a vehicle, by means of which resilience or flexibility is imparted to the vehicle while in motion, thus leaving the outer rim or edge of the wheel free for the employment of a solid elastic rubber or a metallic tire, thereby obviating the danger and annoyance of having the tires punctured or torn, as in the case where pneumatic tires or like parts are employed.

Other features and parts of the invention will be readily understood by reference to the accompanying drawings, which form a part of this specification, and in which—

Figure 1:
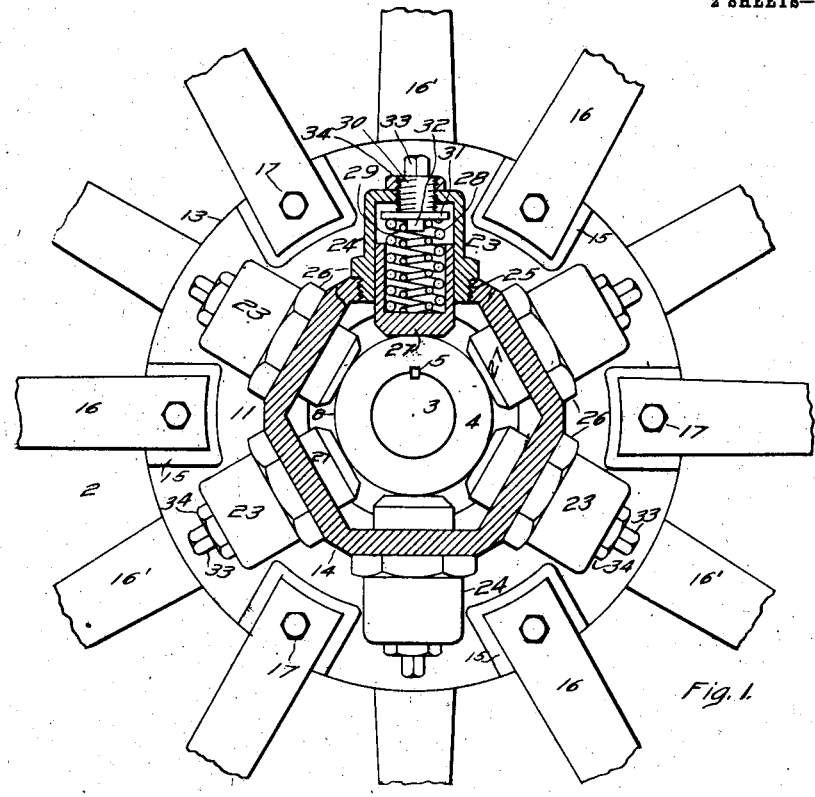
Figure 2:
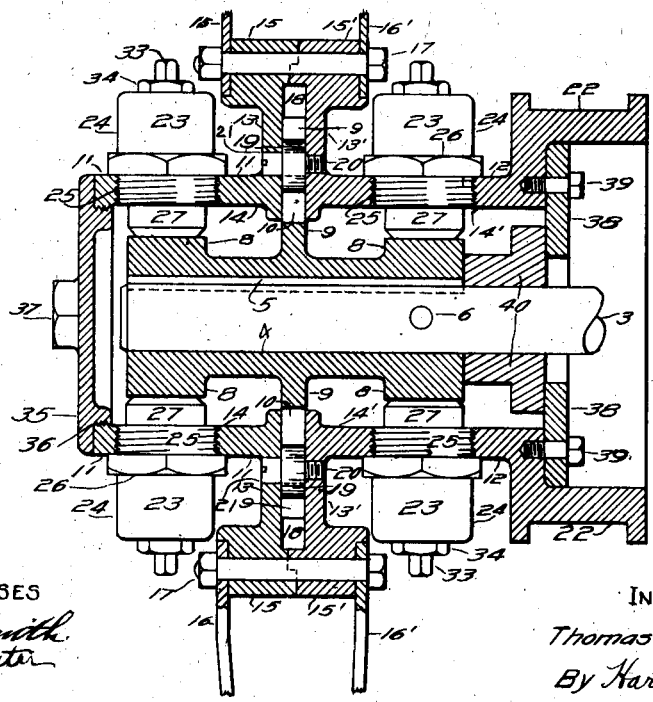
Figure 3:
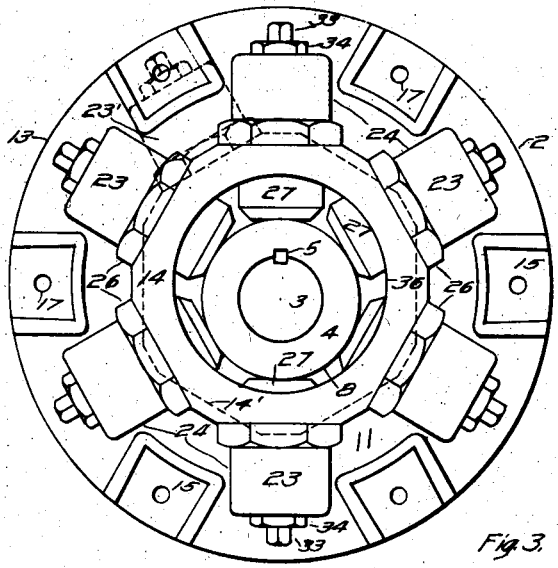
Figure 6:
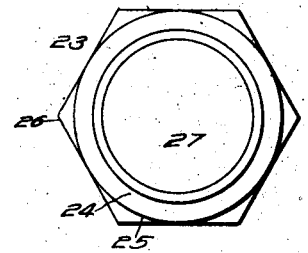
Figure 4:
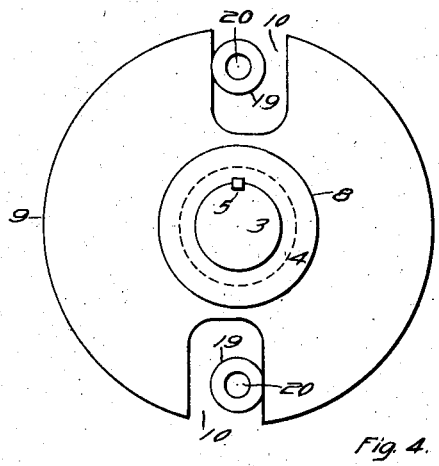
Figure 5:
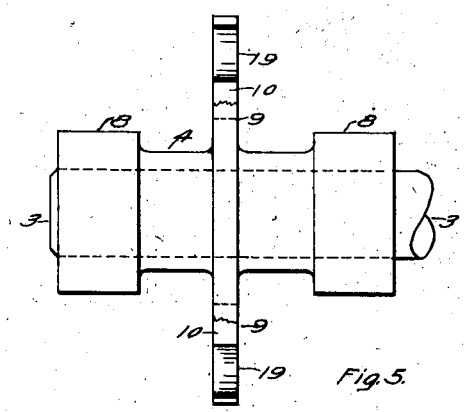

Figure 1 is a view of the central portion of a vehicle-wheel, partly in elevation and partly in section, having the outer dust-plate removed, showing the resilient parts and the manner of constructing and applying them. Fig. 2 is a longitudinal section through the hub of the wheel, showing the axle, the inner and outer hub parts, also showing the spring-boxes and the means for driving the yielding outer hub to which the spokes and tire are attached. Fig. 3 is a view of the wheel similar to Fig. 1, but omitting the spokes, showing the position of the resilient parts immediately after the wheel has encountered an obstruction or dropped from a higher to a lower plane, also showing the relative position of the spring-boxes on the rear side of wheel. Fig. 4 is an end view of the inner hub, showing the annular flange which fits and plays in the recess between the two outer hub parts, also showing the U-shaped openings or slots in said flange, which form a part of the driving means for the interfitting hubs. Fig. 5 is a side elevation of the inner hub. Fig. 6 is an enlarged end view of one of the telescoping spring-boxes.

Similar numbers of reference are applied to corresponding parts throughout the several figures of the drawings.

2 represents my resilient wheel, preferably designed for use in connection with motor-vehicles, but which may be employed with slight modifications on any form of vehicle.

3 represents the axle or shaft and is intended to be made of metal and constructed in the usual form.

4 is the inner hub, preferably made of cast metal and having a keyway to receive the key 5. The wheel shown in the drawings represents one of the rear or power-driven wheels of a motor-vehicle, the axle of which rotates with the wheel, and for that reason I have shown the keyway and key referred to and also the pin 6, which secures the inner hub to the axle. Each end of the inner hub 4 is provided with the enlarged cylindrical portion 8, and at its center it is provided with a large annular flange 9, having the slots or openings 10, which are formed in the opposite edges thereof.

11 and 12 represent the two parts which comprise the outer hub. These are centrally divided and bolted together by means of the flanges 13 and 13'. The parts 11 and 12 are provided, respectively, with the hollow hexagonal hubs or projections 14 and 14', and these are disposed so that the six face sides of the hub 14 have the same plane as the points or angles of the rear hub 14', as shown by the dotted lines in Fig. 3. 15 and 15' are the lugs or projections around the rims of the outer hub parts 11 and 12 and are for use in attaching the spokes 16 and 16'. The drawings show a wheel with twelve spokes, six of which are secured to the lugs 15 on the face side of the wheel and six secured to lugs 15' on the rear face of the wheel. If desired, any even number of spokes may be applied to my wheel. The bolts 17 serve the double purpose of securing the spokes in position and also of clamping together the flanges 13 and 13', as shown in Fig. 2. A shallow annular recess is formed in the flanges 13 and 13' of the hub parts 11 and 12, and when the latter parts are bolted together, as described, they form one large recess 18 with plane parallel sides, in which the central flange 9 of the inner hub fits and plays. The object of the flange 9 and the recess 18 is to maintain the plane of the wheel in true rectangular relation to the axle 3, upon which the inner hub 4 is secured during their relative movements. The said flange also serves a useful purpose in case the spring-boxes should collapse by the breaking of the springs by taking a bearing at the bottom of recess 18, thus saving the wheel from breaking down and enabling the occupant of the vehicle to drive it home.

19 represents a pair of small rollers which are disposed in the slots 10 of the central flange 9. These rollers are mounted loosely upon the pins or axles 20 and turn freely thereon. The pins 20 are threaded at one end into the outer hub part 12, the other end fitting into the hole or socket 21 formed in the outer hub part 11. I have found this arrangement of the pins necessary in order to facilitate assembling of the parts.

22 represents an annular flanged extension cast or formed with the outer hub part 12 for use in braking the vehicle and wheel. I have not shown the other parts of the brake appliance; but the part 22 is intended to cooperate with the well-known hub-brake attachments.

23 23 represent a series of spring-boxes, preferably made of steel and so formed that one part fits into and telescopes with the other. I have shown six of these boxes on the face and a like number are disposed on the rear side of the wheel, the latter being staggered with reference to those on the face side in such manner that the spring-boxes on both sides divide the wheel center into twelve equal spaces. The dotted lines 23' in Fig. 3 show the relative position of one of the rear spring-boxes. Each spring-box comprises the socket or casing 24, which is secured to the hollow hexagonal parts 14 and 14' of the outer hub parts 11 and 12 by means of the threaded portions 25, and in order to tighten the sockets 24 securely I have provided thereon the hexagonal nut-like portions 26 for use in applying a wrench.

27 represents the telescoping thimble, which fits and plays in the socket 24 of each box. These thimbles are made hollow to receive the springs 28 and 29, which exert their tension to force the thimbles out of the sockets. The outer or closed ends of the thimbles, as shown in Figs. 1, 2, and 3, rest or bear against the enlarged cylindrical portions 8 of the inner hub 4, and if the springs are all given the same tension the inner hub will accordingly be held in a true central position with reference to the rest of the wheel.

The spring 28 is preferably coiled right-handed and of a diameter to fit loosely in the thimble 27. The ends are made level so as to bear evenly against the closed ends of the thimbles and sockets. The spring 29 is preferably coiled left-handed and is made from a smaller gage of wire and just large enough to operably fit inside the spring 28. These springs are of equal length and when properly made and tempered may be adjusted to yield any desired degree of resilience. It would scarcely be possible to make so large a series of springs and have them all of equal strength and flexibility or to set or incase them so that their tension might not require varying to suit different conditions. Hence I have provided an adjustable part 30, which is threaded into the outer closed end of the socket 24, and near its inner end I have provided an annular flange 31 large enough to afford a bearing for both of the springs. Below this flange occurs the central projecting part 32, which loosely fits the opening in spring 29. The purpose of this latter part is to keep the springs in line and prevent them from shifting about in the outer end of socket 24. The outer hexagonal projection 33 is for applying a wrench to effect the adjustment of the springs.

34 is a jam-nut for use in holding the part 30 in any desired position.

The outer face side of the wheel-hub is provided with the annular dust-cap or disk 35, secured to the part 11 of the outer hub by means of the threads at 36. When this plate or cap is thus applied, the hollow space between the outer and inner hubs is sealed against the admission of dust or dirt. Dust-cap 35 may be screwed into outer hub by hand and then tightened up by means of a wrench applied to the nut-like projection 37, formed upon the central part of the cap, as shown in Fig. 2.

In order to prevent dust or dirt from entering the interior of the hub from the rear side of the wheel, I have provided the ring or annular plate 38, which overlaps the flanged collar 40, by means of which the space between the axle 3 and the brake-hub 22 is closed. The ring or plate 38 is made to fit into the hollow side of part 22, and it is secured to the outer hub part 12 by the screws 39, as shown in Fig. 2. This ring or plate has a central opening circular in form, which is considerably larger than the diameter of the axle, and thus allows the axle to be moved or thrown off center in any direction for a distance equal to the flexing of the springs and thimbles. The flanged collar 40 is intended to be made to fill the space between the ring 38 and the end of inner hub 4 and form a tight joint where it bears or slides against said ring. The flange of part 40 is larger in diameter than the central opening in ring 38 and is so arranged that it slides upon said ring, whereby dust and dirt are effectually excluded from the interior of the hub, while the requisite play is permitted at all times during the variable movements of the axle or wheel.

The driving means between the outer and inner hubs as explained above consists of a pair of rollers 19, mounted upon the pins 20, held in place by the outer hub parts 11 and 12. These rollers are afforded considerable play in the U-shaped slots or notches 10, which are formed in the central flange 9 of the inner hub. When the power from the motor or other source is applied to axle 3, the inner hub 4 being secured to said axle is also driven thereby. The power thus applied is communicated to the rollers 19 when the vehicle is moving either forward or backward by the engagement of the straight edges of notches 10 with said rollers, as shown in Fig. 4 of the drawings. These notches or slots are made considerably wider than the diameter of the rollers, so as to allow a slight yielding as between the inner and outer hubs at times when the wheel strikes obstructions or uneven spots in the roadway. The slots 10 are made deep enough to allow the rollers to travel back and forth toward and from the axle corresponding with the flexing or yielding of the springs 28 and 29 and the variations of the plane of the axle. By providing two rollers and disposing them as shown herein there will be no interval, however short, during the movement of the vehicle in either direction, in which both of the rollers 19 will be out of engagement with the sides or edges of the slots 10. Where only one roller is employed, unless the roadway is very smooth the roller will frequently break contact with the edge of the slot, especially when the wheel recoils on account of shocks received, and the effect is to give a jerky sensation to the occupant of the car. Where the resilient parts are applied to wheels which are not driven, as the front wheels of motor-vehicles, the inner hub will not be keyed or pinned to the axle, as shown herein, and the flanged projection 22 for use in braking will also be omitted. In other respects the wheel will be the same, except that ball-bearings may be applied to the front wheels where none are shown on the rear or driven axle. Any form of solid tires may be employed on the rims of wheels having the resilient hub construction shown herein.

Obviously the detail construction of the wheel as herein shown and described may be altered without departing from the spirit of my invention, and I therefore do not confine the same to the specific arrangement of parts herein shown.

Having thus described my invention, what I claim as new, and desire to secure by Letters Patent, is—

1. In a vehicle-wheel, a hollow outer hub, a central inner hub, an axle secured to said inner hub, a series of telescoping spring-boxes attached to the hollow outer hub, a pair of right and left hand coiled springs incased in each of said spring-boxes, an annular recess in said outer hub, a central flange formed on said inner hub adapted to fit and play in said recess, U-shaped slots in said central flange, a pair of rollers mounted in said recess adapted to coöperate with said U-shaped slots to effect the positive driving of said outer hub, substantially as described.

2. In a resilient wheel, a two-part hollow outer hub, a one-part inner hub, an axle secured to said inner hub, a series of telescoping spring-boxes forming a resilient connection between said outer and inner hubs, a pair of interfitting reversely-coiled springs incased in each of said spring-boxes, means for adjusting the tension of each pair of springs separately, a recess formed centrally in said outer hub at right angles to said axle, a pair of driving-rollers operably mounted within said recess, a central flange on said inner hub adapted to fit and play in said recess, a pair of oppositely-formed slots in said flange adapted to engage said rollers and thereby effect the driving of said outer hub, and a flanged projection on said outer hub for use in braking said wheel, substantially as described.

3. A resilient wheel for motor-vehicles, comprising a two-part outer hub, a one-part inner hub, a central recess in said outer hub, a central flange on said inner hub adapted to fit and play in said recess, a series of slots or openings in said flange, a series of rollers operatively mounted in said recess adapted to form a yielding frictionless driving connection between said outer and inner hubs, a series of spring-boxes secured to each of said outer hub parts, a telescoping thimble fitting each of said spring-boxes, a pair of reversely-coiled springs in each of said spring-boxes and thimbles, and means for adjusting the tension of said springs, substantially as described.

4. A resilient wheel for motor-vehicles, comprising a hollow outer hub in two parts, an inner hub in one part, an axle secured to said inner hub, an annular recess between the abutting sides of said outer hub parts, a flange on said inner hub, oppositely-facing slots in said flange, rollers mounted in said recess in position to engage said slots, spring-boxes mounted upon both parts of said outer hub, reversely-coiled springs in said spring-boxes, telescoping thimbles fitting each spring-box adapted to be forced or held outwardly against said inner hub by the tension of said springs, thereby forming a resilient connection between the outer and inner hubs, substantially as described.

5. A resilient wheel for motor-vehicles, comprising a hollow outer hub, a central inner hub secured to the axle of a vehicle, a central flange on said inner hub, slots in said flange, a recess in said outer hub, rollers in said recess adapted to engage said slots and thereby effect the driving of said outer hub, spring-boxes secured to said outer hub, a pair of reversely-coiled springs in each spring-box, a thimble fitting and playing in each spring-box and also bearing against said inner hub, a dust-cap secured to the face of the outer hub, a dust-ring, and a flanged collar to exclude dust from the rear of said hubs, substantially as described.

6. A wheel for motor-vehicles, comprising a two-part outer hub, an annular recess between said outer hub parts, a central hollow hub on each of said outer hub parts, a series of telescoping spring-boxes secured to each of said hollow hubs, a pair of interfitting reversely-coiled springs in each of said spring-boxes, an inner hub, a central flange on said inner hub adapted to fit and play in said annular recess, a pair of oppositely-disposed slots in said flange, a pair of rollers mounted in said annular recess in position to engage and play in said slots, and means for excluding dust and dirt from the interior of said hubs, substantially as described.

7. In a vehicle-wheel, a hollow outer hub, a central inner hub, an axle for said inner hub, spring-receiving boxes attached to one of said hubs, springs in said boxes, a flange on one of said hubs fitting in a recess in the other hub and formed with slots, and rollers connected to one of the hubs and fitting in the slots of said flange for transmitting movement from one hub to the other, substantially as described.

8. In a vehicle-wheel, a hollow outer hub, a central inner hub, a flange on one of said hubs fitting in a recess in the other hub and formed with slots, and rollers connected to one of the hubs and fitting in the slots of said flange, said rollers normally bearing against one wall of the slots in which they respectively fit and having a lateral play therein, the walls against which the rollers bear being on oppositely-disposed sides of the rollers so that one roller will always be in bearing contact with one wall of its slot, substantially as described.

9. In a vehicle-wheel, a hollow outer hub, a central inner hub, a flange on one of said hubs fitting in a recess in the other hub and formed with slots, and rollers connected to one of the hubs and fitting in the slots of said flange and capable of movement therein toward and from the axis of the wheel and laterally thereto, substantially as described.

10. In a vehicle-wheel, a hollow outer hub, a central inner hub, and members attached to one hub and bearing at oppositely-disposed points against a part of the other hub so as to transmit movement from one hub to the other in both the forward and backward movement of the wheel, said members being adapted to permit one hub to have a movement to and from the axis of the wheel and laterally thereto, substantially as described.

In testimony whereof I affix my signature in presence of two witnesses.

THOMAS W. BROOMELL.

Witnesses.
 EDGAR V. BLOODOUGH,
 HARRY DE WALLACE.